No. 895,801. PATENTED AUG. 11, 1908.
P. SCHUBERT.
CURRENT TRANSFORMER.
APPLICATION FILED AUG. 27, 1906.

WITNESSES.
Benjamin B. Hull
Grace M. Hanigan

INVENTOR.
PAUL SCHUBERT.
by Albert G. Davis
Atty.

UNITED STATES PATENT OFFICE.

PAUL SCHUBERT, OF BERLIN, GERMANY, ASSIGNOR TO GENERAL ELECTRIC COMPANY, A CORPORATION OF NEW YORK.

CURRENT-TRANSFORMER.

No. 895,801.        Specification of Letters Patent.        Patented Aug. 11, 1908.

Application filed August 27, 1906. Serial No. 332,288.

*To all whom it may concern:*

Be it known that I, PAUL SCHUBERT, a subject of the King of Prussia, residing at Berlin, Germany, have invented certain new and useful Improvements in Current-Transformers, of which the following is a specification.

It has long been the custom to use current transformers with measuring instruments where the currents to be measured are above a certain strength. The primary winding of these current transformers consisted, for large current strengths, ordinarily of a straight copper band or rod, while the iron core of the transformer, in order to avoid too high induction, was provided with an air gap. The accuracy of such current transformers, however, left much to be desired. With closed iron cores on the other hand, it was necessary, the single bar primary being used, to increase the number of secondary windings and the cross section of the iron in order that the induction in the iron might not be too high. This arrangement was open to the objection that the parts were large and heavy, and was also open to the objection, that, the number of secondary turns being large, a high potential was induced therein when the circuit was open, and great care was necessary in cutting in or out the measuring instrument.

According to my present invention the current transformer which I have produced avoids these disadvantages, and may be constructed for all values of currents without alteration of the number of primary and secondary windings.

Figure 1:
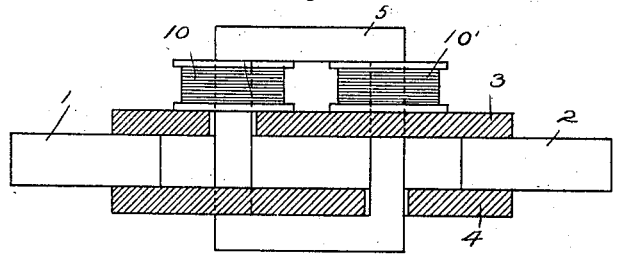
Figure 2:
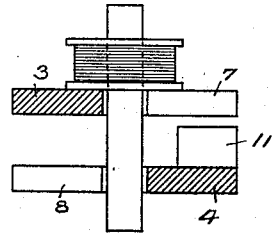
Figure 3:
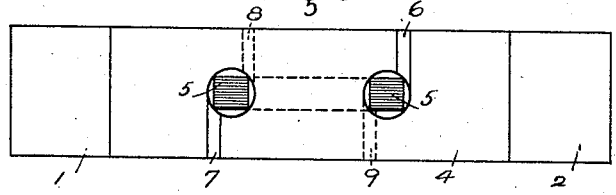
Figure 5:
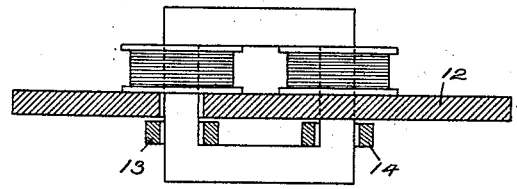
Figure 4:
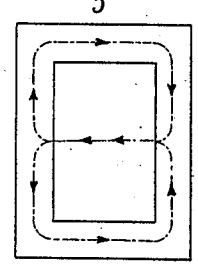

The invention will be better understood by reference to the following description taken in connection with the accompanying drawings, in which Figures 1, 2 and 3 represent different views of an apparatus embodying my invention, and Fig. 4 is an explanatory diagram,— while Fig. 5 represents a modified form of apparatus.

Referring to Figs. 1, 2 and 3, the parts 1 and 2 represent the opposite ends of a bus bar or other conductor in which the transformer is to be connected. Two broad copper bars 3 and 4 are clamped respectively on opposite sides of the bars 1 and 2, as indicated, and each is provided with perforations through which the iron core 5 is passed. In order to provide for the threading of current around the legs of the core, slots 6 and 7 are cut in the respective bars, as indicated, and so that in the bar 3 they run in the opposite direction from those in the bar 4, as shown by the dotted lines 8 and 9, and as shown more especially in Fig. 2. The two bars, with current passing in them, will thus induce lines of force which are opposite each other and which tend to leak across the space between the bars as indicated by the diagram in Fig. 4. If now, above the upper bar or below the lower bar, or on the two at the same time are arranged secondary coils 10' and 10, then a potential corresponding to the partial effect of the lines of force is induced. This partial effect of the lines of force can be varied by varying the number of bars 3, 4, or by employing an iron piece 11 which may be adjusted to shunt more or less of the lines of force between the legs of the core 5. A similar effect, namely, avoidance of high induction in the iron core, can also be secured by using one bar as indicated at 12 in Fig. 5, provided also that short circuiting coils 13 and 14 or the like are employed, since these possess the property of inducing lines of force displaced by 180 degrees with relation to the primary field, and thereby produce a weakening of the field. By varying the resistance of these short circuited windings, adjustment of the magnetic flux is secured.

What I claim as new and desire to secure by Letters Patent of the United States, is,—

1. A current transformer having a core, a secondary winding and a primary winding and means including the primary winding for producing two opposing alternating fluxes in the core.

2. A current transformer having a core, a secondary winding and a primary winding and means for weakening the alternating flux due to the primary winding passing through the secondary winding.

3. A current transformer having a core, a secondary winding and a primary winding consisting of two portions producing opposing alternating fluxes in the core.

4. A current transformer having a core, a secondary winding and a primary winding consisting of two portions producing opposing alternating fluxes in the core, and means for varying the flux passing through the secondary winding.

5. A current transformer having a core, a secondary winding, a primary winding consisting of a straight conductor and means including the primary winding for producing two opposing alternating fluxes in the core.

6. A current transformer having a secondary winding, a core and a primary winding consisting of a straight conductor, the core passing through the primary conductor and being in inductive relation thereto.

7. A current transformer having a secondary winding, a primary winding consisting of straight conductors, a core passing through the primary conductors and in inductive relation thereto, the primary winding producing two opposing alternating fluxes in the core.

8. A current transformer having a secondary winding, a primary winding consisting of straight conductors, a core passing through the primary conductors and in inductive relation thereto, the primary winding producing two opposing alternating fluxes in the core and means for varying the flux passing through the secondary winding.

9. A current transformer having a core, a primary winding consisting of a plurality of straight conductors in inductive relation to the core, partially divided at right angles to the direction of the flow of current in them, to produce opposing fluxes in said core, and a secondary winding in inductive relation to said core.

10. A current transformer having a primary winding consisting of a plurality of straight parallel conductors joined together at their two extremities, a core consisting of two legs with members joining said legs, the legs passing through holes in the primary conductors and being at right angles to them, slots cut partially through each conductor from one edge of the conductor to the hole encircling the core legs and at right angles to the direction of the current flowing through the conductors, the slots so cut that the current flowing in the conductors will produce a flux in the core and successive conductors having slots so cut in them as to produce opposing fluxes in the core, and a secondary consisting of two coils wound around the legs of said core and means for weakening the flux passing through the secondary winding.

In witness whereof I have hereunto set my hand this 13th day of August, 1906.

PAUL SCHUBERT.

Witnesses:
   JULIUS RÜMLAND,
   CARL G. NICKELSEN.